United States Patent [19]

Zafred et al.

[11] Patent Number: 5,573,867
[45] Date of Patent: Nov. 12, 1996

[54] PURGE GAS PROTECTED TRANSPORTABLE PRESSURIZED FUEL CELL MODULES AND THEIR OPERATION IN A POWER PLANT

[75] Inventors: Paolo R. Zafred, Pittsburgh; Jeffrey T. Dederer, Valencia; James E. Gillett, Greensburg; Richard A. Basel, Plub Borough; Annette B. Antenucci, Pittsburgh, all of Pa.

[73] Assignee: Westinghouse Electric Corporation, Pittsburgh, Pa.

[21] Appl. No.: 594,214

[22] Filed: Jan. 31, 1996

[51] Int. Cl.⁶ .............................. H01M 8/04; H01M 8/24
[52] U.S. Cl. .................. 429/17; 429/24; 429/26; 429/31; 429/34
[58] Field of Search .................. 429/12, 13, 17, 429/19, 22, 24, 26, 30, 31, 34, 25, 35; 29/623.2

[56] References Cited

U.S. PATENT DOCUMENTS

| | | | |
|---|---|---|---|
| 3,972,731 | 8/1976 | Bloomfield et al. | 136/86 R |
| 4,395,468 | 7/1983 | Isenberg | 429/31 |
| 4,476,196 | 10/1984 | Poppel et al. | 429/32 |
| 4,476,198 | 10/1984 | Ackerman et al. | 429/32 |
| 4,622,275 | 11/1986 | Noguchi et al. | 429/19 |
| 5,169,730 | 12/1992 | Reichner | 429/20 |
| 5,413,879 | 5/1995 | Domeracki et al. | 429/30 |

OTHER PUBLICATIONS

"Solid Oxide Fuel Cell", Westinghouse Electric Corporation, Oct., 1992.
"Fuel Cells Make Their CPI Moves", B. R. Gilbert, et al., *Chemical Engineering*, Aug., 1995, pp. 92–96.
"Molten Carbonate Fuel Cell Demonstrates its Commercial Readiness", S. E. Kuehn, *Power Engineering*, Mar., 1995, p. 16.

*Primary Examiner*—Anthony Skapars

[57] ABSTRACT

A fuel cell generator apparatus and method of its operation involves: passing pressurized oxidant gas, (O) and pressurized fuel gas, (F), into fuel cell modules, (10 and 12), containing fuel cells, where the modules are each enclosed by a module housing (18), surrounded by an axially elongated pressure vessel (64), where there is a purge gas volume, (62), between the module housing and pressure vessel; passing pressurized purge gas, (P), through the purge gas volume, (62), to dilute any unreacted fuel gas from the modules; and passing exhaust gas, (82), and circulated purge gas and any unreacted fuel gas out of the pressure vessel; where the fuel cell generator apparatus is transpatable when the pressure vessel (64) is horizontally disposed, providing a low center of gravity.

25 Claims, 7 Drawing Sheets

PURGE GAS PROTECTED TRANSPORTABLE PRESSURIZED FUEL CELL MODULES AND THEIR OPERATION IN A POWER PLANT

GOVERNMENT CONTRACT

The Government of the United States of America has rights in this invention, pursuant to Contract No. DE-FC21-91MC28055 with the United States Department of Energy.

FIELD OF THE INVENTION

The invention relates to purge gas protected, pressurized, solid oxide electrolyte, fuel cell generator modules, and to an array of such generator modules disposed in a transportable pressure vessel for use with a variety of auxiliary components in a power generation system of the 100 kW to 50 MW plus capacity.

BACKGROUND AND SUMMARY OF THE INVENTION

Fuel cell based, electrical generator apparatus utilizing solid oxide electrolyte fuel cells ("SOFC") arranged within a housing and surrounded by insulation are well known, and taught, for example, by U.S. Pat. Nos: 4,395,468 (Isenberg) and "Solid Oxide Fuel Cell", Westinghouse Electric Corporation, October, 1992, for tubular SOFC; 4,476,196 (Poppel, et al.) for flat plate SOFC; and 4,476,198 (Ackerman, et al.) for "corrugated" SOFC. The tubular type fuel cells can comprise an open or closed ended, axially elongated, ceramic tube air electrode material, which may be deposited on a ceramic support tube, completely covered by thin film ceramic, solid electrolyte material. The electrolyte layer is covered by cermet fuel electrode material, except for a thin, axially elongated, interconnection material. The flat plate type fuel cells can comprise a flat array of electrolyte and interconnect walls, where electrolyte walls contain thin, flat layers of cathode and anode materials sandwiching an electrolyte. The "corrugated" plate type fuel cells can comprise a triangular or corrugated honeycomb array of active anode, cathode, electrolyte and interconnect materials. Other fuel cells not having a solid electrolyte, such molten carbonate fuel cells are also well known, and can be utilized in the article and method of this invention.

Development studies of SOFC power plant systems have indicated the desirability of pressurized operation. This would permit operation with a coal gasifier as the fuel supply and/or use of a gas turbine generator as a bottoming cycle. Integration is thought commercially possible because of the closely matched thermodynamic conditions of the SOFC module output exhaust flow and the gas turbine inlet flow.

Conventional combustor in a gas turbine system typically exhibit high nitrogen oxides (NOx) emissions, combustion driven oscillations and instabilities, excessive noise and low efficiencies. A typical diffusion flame combustor will produce about 200 parts per million NOx (corrected to 15% $0_2$) when operated at base load on natural gas fuel in a typical combustion turbine. Although significant advances have been made to mitigate these problems, it has proved difficult to design a practical, ultra-low NOx, high-turn-down ratio combustor due to poor flame stability characteristics. The combination of all the above factors results in pressurized SOFC generator module design being suitable as a replacement of conventional gas turbine combustor and applicable to more efficient combined cycle power plants required to meet increasingly stringent emission targets.

A variety of fuel cell use in power plant systems are described in the literature. In U.S. Pat. No. 3,972,731 (Bloomfield et al.), a pressurized fuel cell power plant is described. There, air is compressed by compressor apparatus, such as a compressor and turbine which are operably connected, which is powered by waste energy produced by the power plant in the form of a hot pressurized gaseous medium, such as fuel cell exhaust gases. These exhaust gases are delivered into the turbine, which drives the compressor for compressing air delivered to the fuel cells. In U.S. Pat. No. 5,413,879 (Domeracki et al.) a SOFC is also integrated into a gas turbine system. There, pre-heated, compressed air is supplied to a SOFC along with fuel, to produce electric power and a hot gas, which gas is further heated by combustion of unreacted fuel and oxygen remaining in the hot gas. This higher temperature gas is directed to a topping combustor that is supplied with a second stream of fuel, to produce a still further heated gas that is then expanded in a turbine.

U.S. Pat. No. 4,622,275 (Noguchi et al.) also describes a fuel cell power plant, where reformed, reactive fuel is fed to an anode of the cell, an expansion turbine connected to a compressor feeds compressed gas into the cathode of the cell, which compressed gas is mixed with anode exhaust gas which had been combusted. A variety of fuel cell types, in various system configurations is described by B. R. Gilbert et al. in "Fuel Cells Make Their CPI Moves", in Chemical Engineering, August 1995, pp. 92–96. Specifically, a conceptual design of a 1 MW commercial unit shows two molten carbonate fuel cell stacks and two associated reformers enclosed within a horizontal cylindrical vessel. There is no teaching of purge gas use. The same concept is also reviewed by S. E. Keuhn in "Molten-Carbonate Fuel Cell Demonstrates its Commercial Readiness", Power Engineering, March, 1995, p. 16.

Fuel cell pressurization, while advantageous in system performance, presents several practical difficulties to the SOFC generator designer, two of which are: (1) The pressure boundary must be able to withstand pressures up to 20 atmospheres. The pressure boundary of existing generators operating at one atmosphere pressure is the outside SOFC generator wall, which typically operates at temperatures between 600° C. and 800° C. Construction of a pressure boundary to operate at 20 atmospheres and 800° C. would be difficult, even with exotic materials, and probably prohibitively expensive. Therefore, a pressure boundary with reduced wall temperature is desirable; (2) Because fuel and air are brought together within the SOFC generator, care must be taken to avoid-the potential of an unstable condition during startup and operation. This is only a limited concern at one atmosphere, since the explosive overpressure with the gaseous fuels used in the SOFC is about seven or eight times the absolute operating pressure. For atmospheric operation, the expected explosive overpressure would be about 115 psi (8.10kg/cm$^2$) which existing designs can accommodate by mechanical strength alone. However, the expected explosive overpressure at 20 atmospheres is about 2315 psi (163kg/cm$^2$). An enclosure designed to contain the explosion overpressure at 20 atmospheres would be extremely expensive. A protective containment system to prevent the accumulation of an explosive gas mixture is required. It would also be highly desirable to have a transportable, fuel cell based electrical generator apparatus in the 1MW (megawatt) to 10 MW class which can be assembled at the factory and shipped long distance to the power plant location. It is one of the objects of this invention to provide safe, transportable fuel cell modules and a method of transporting and operating such modules.

Accordingly, the invention resides in a fuel cell generator apparatus characterized by containing at least one fuel cell assembly module containing a plurality of fuel cells, each fuel cell having electrolyte between an oxidant electrode and a fuel electrode; where the module is enclosed by a module housing capable of withstanding temperatures over 600° C.; where the module housing is surrounded by an axially-elongated pressure vessel having two ends, such that there is a purge gas space between the module housing and the pressure vessel; where the pressure vessel has a fuel gas inlet connecting to a module fuel gas inlet, an oxidant gas inlet connecting to a module oxidant gas inlet, an exhaust gas outlet connecting to a module exhaust gas outlet, and a purge gas inlet connecting to the purge gas space between the module housing and the pressure vessel; and where the purge gas space is effective to control any unreacted fuel gas flow from the module by dilution with purge gas. The fuel cells will generally operate at temperatures over about 650° C., usually over about 650° C. and up to about 1100° C. The module housing and the fuel cells can operate in the "pressurized" mode, that is over about 2 atmospheres, or about 28.5 psi (pounds per square inch — 2.0 kg/sq.cm), preferably at about 10 atmospheres. Gaseous oxidant channels from the oxidant inlet can connect to cooling ducts in the module housing walls to allow gaseous oxidant passage through the cooling ducts to the fuel cells, the gaseous oxidant acting as a cooling gas, and the fuel gas inlet can connect to the module fuel gas inlet through a common manifold.

The invention also resides in a method of operating a fuel cell generator apparatus characterized by the steps of: (1) passing oxidant gas and fuel gas, both being pressurized, through inlets and into a plurality of fuel cell assembly modules, each module containing a plurality of fuel cells, each fuel cell having electrolyte between an oxidant electrode and a fuel electrode, where the modules are each enclosed by a module housing capable of withstanding temperatures over 600° C.; where the module housings are surrounded by an axially-elongated pressure vessel having two ends, such that there is a purge gas space between the module housings and the pressure vessel, the oxidant gas and fuel gas also passing through the pressure vessel enclosing the modules; (2) passing pressurized purge gas through the pressure vessel to circulate within the purge gas space, where the purge gas dilutes any unreacted fuel gas flow from the module; and (3) passing exhaust gas and circulated purge gas and any unreacted fuel gas out of the pressure vessel.

The generator apparatus can operate at interior temperatures up to about 1100° C. in a flow of fuel, and oxidant such as oxygen or air. Thermocouples measure module housing temperature and if it is below about 520° C. (fuel autoignition temperature) they effect shut off of the fuel inlet. The generator apparatus will also have associated with it and will be working in cooperation with well known auxiliaries, such as controls; an oxygen or air preheater; a fuel gas compressor; a fuel desulfurizer; an oxygen or air compressor which may be operably connected to a power turbine coupled to an electric generator; a purge gas compressor, which may be the same as the air compressor; a source of fuel gas and purge gas; heat exchangers; a heat recovery unit to recover heat from the hot fuel cell exhaust gases; and a topping combustor, to provide an electrical power generation system. This type power system could be, for example, part of an integrated, coal gasification/fuel cell-steam turbine combination power plant, featuring a plurality of coal gasifiers and fuel cell generator arrays or power blocks with associated DC/AC conversion switchgear. This type power system could also be part of a natural gas fired combustion turbine system, or the like.

The invention further resides in a method of transporting fuel cells in a fuel cell generator apparatus characterized by the steps of: (1) electronically connecting together a plurality of fuel cell assembly modules in a horizontal plane each module containing a plurality of fuel cells, (2) inserting the connected modules into an axially-elongated, horizontally disposed pressure vessel having two ends, to provide a low center of gravity generator apparatus, where there is a purge gas space between the modules and the pressure vessel; (3) providing inlets into the pressure vessel for feed fuel, feel oxidant, and purge gas, and outlets for exhaust gases; and (4) transporting the generator apparatus with its pressure vessel and contained fuel cell assembly modules.

This pressurized fuel cell generator apparatus design provides a unique safety feature for fuel cell operation, an easily transportable assembly, and eliminates nitrogen oxide emissions. By combining several modules within the pressure vessel, it is possible to operate the fuel cells at high pressure, typically at 10 atmospheres, thus greatly improving overall SOFC module voltage, efficiency and power output to the extent that it becomes feasible to integrate this apparatus with an industrial gas turbine in a high efficiency combined cycle power plant. This integration is possible because of the closely matched thermodynamic conditions of the SOFC module output exhaust flow and the gas turbine inlet flow. In other words, the SOFC module acts as a conventional combustor in a gas turbine and it provides the volumetric flow rate, at the required temperature and pressure, which is discharged through the turbine.

Integration of these pressurized SOFC modules with conventional gas turbines in a combined cycle power plant, will boost overall electrical efficiencies to 65–70%, values presently unmatched by any other power generation technology. The pressurized SOFC generator modules will result in a design that can be used with the full range of existing commercial combustion turbines and will not require modification to the units other than in the fuel and combustor system. Because of its modular design, this pressurized SOFC generator concept is scalable and it may be applied to large size SOFC Combustion Turbine systems without much engineering effort. Other additional advantages include, but are not limited to, lower pressure on the air feed side, the capability of modulated heat output and smaller air-to-exhaust recuperators and ducting.

BRIEF DESCRIPTION OF THE DRAWINGS

For a better understanding of the invention, reference may be made to the preferred, non-limiting embodiments exemplary of the invention, shown in the following drawings, in which.

DESCRIPTION OF THE PREFERRED EMBODIMENTS

The fuel cells used inside the generator apparatus of this invention can be solid oxide electrolyte or molten carbonate fuel cells of any type or configuration. However, for purposes of simplicity, tubular, solid oxide electrolyte fuel cells will be discussed as an exemplary type useful in this invention, and the description herein-after will generally relate to that type, which shall in no way be considered limiting as to the scope of the invention.

Solid oxide electrolyte fuel cells (SOFC) are highly efficient devices that convert chemical energy into electricity. They operate at atmospheric or elevated pressures at a temperature of approximately 1000° C. to produce electricity using a variety of fossil fuels such as coal derived fuel gas, natural gas, or distillate fuel. The temperature of the exhaust gases from the cells is between 500° C. to 850° C., a temperature which is attractive for cogeneration applications or for use in bottoming cycles for all-electric central station power plants.

An operating SOFC readily conducts oxygen ions from an "air" electrode (electrode which air or oxidant contacts-cathode), where they are formed, through a solid electrolyte to a "fuel" electrode (electrode which fuel contacts-anode). There they react with carbon monoxide (CO) and hydrogen ($H_2$) contained in the fuel gas to deliver electrons and produce electricity. The tubular SOFC features a porous air electrode made of doped lanthanum manganite. A gas-tight electrolyte of yttria-stabilized zirconia (approximately 40 micrometers thick) covers the air electrode, except in a strip about 9mm wide along the entire active cell length. This strip of exposed air electrode is covered by a thin, dense, gas tight layer of doped lanthanum chromite. This layer, termed the cell interconnection, serves as the electric contacting area to an adjacent cell or to a power contact. The fuel electrode is a nickel-zirconia cermet and covers the electrolyte surface except in the vicinity of the interconnection.

For operation, gaseous oxidant, typically air is introduced into the fuel cell, generally through an air feed tube. The air, discharged near the closed end of the cell, flows through the annular space formed by the cell and its coaxial feed tube. Gaseous fuel flows on the outside of the cell. Typically, 85% of the fuel is electrochemically utilized (reacted) in the active fuel cell section. The gas-impervious electrolyte does not allow nitrogen to pass from the air side to the fuel side, hence the fuel is oxidized in a nitrogen free environment, averting the formation of NOx. At the open end of the cell, the remaining fuel is reacted with the air stream exiting the cell, thereby providing additional useful heat. Reformation of natural gas and other fuels containing hydrocarbons can be accomplished, if desired, externally or within the generator. Incoming fuel can be reformed to $H_2$ and CO within the generator, eliminating the need for an external reformer. All the gas flows and reactions are controlled within the generator apparatus.

To construct an electric SOFC generator, individual cells are bundled into an array of series-parallel electrically connected fuel cells, forming a structure that is a basic generator building block. The individual bundles are arrayed in series to build generator voltage and to form submodules. The parallel electrical connection of the cells within a bundle enhances generator reliability. Submodules are further combined in either parallel or series connections to form the generator module. For a more complete description of tubular fuel cells and their operation in a generator apparatus, reference can be made to U.S. Pat. No. 4,395,468 (Isenberg).

Figure 1:
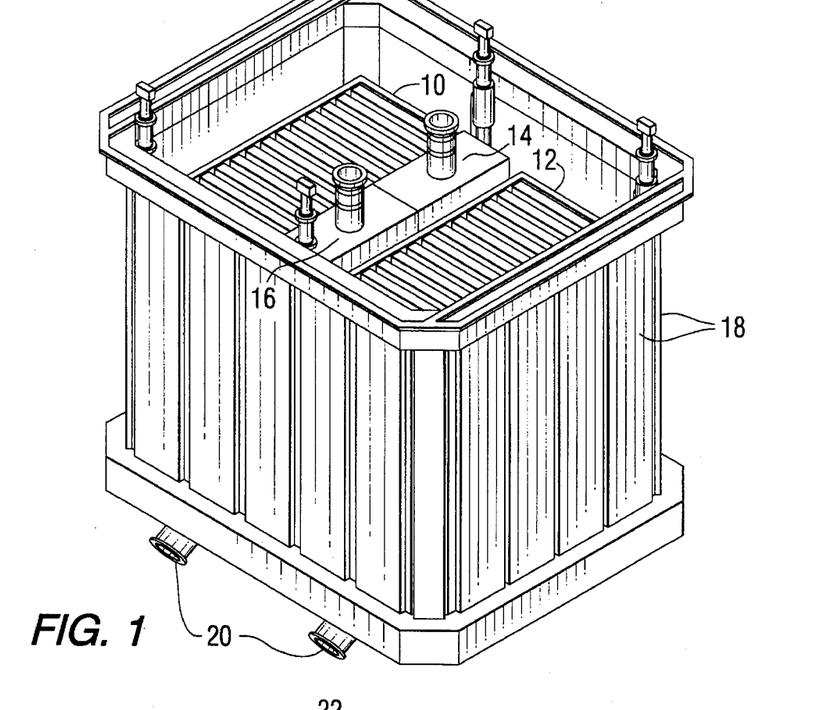
FIG. 1, shows a three dimensional top view of two fuel cell stack modules in a surrounding module housing, where two fuel pre-reformers and two spent fuel recirculation plenums are between the assembly modules.
Figure 2:
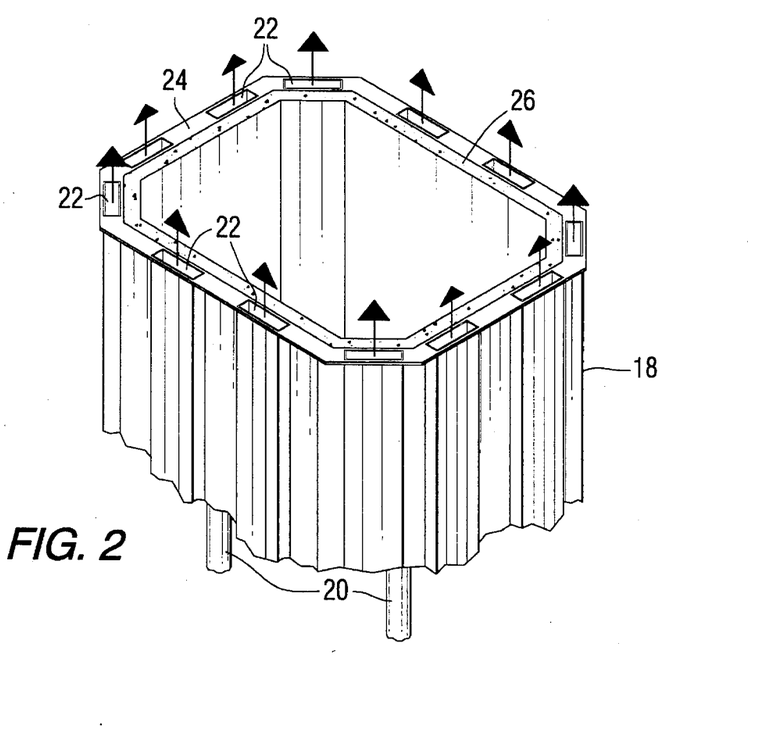
FIG. 2, shows a cut-away three dimensional view of one embodiment of a self cooling module housing showing integral cooling ducts and internal insulation around the periphery of the housing.

Referring now to FIG. 1 of the drawings, one embodiment of two fuel cell stack modules 10 and 12 are shown with spent fuel recirculation plenums 14 and 16 therebetween. The module housing 18 can contain one or more modules with any associated recirculation plenums and pre-reformer assemblies. The module housing must withstand fuel cell operating temperatures of 800° C. to 1100° C. and must be made of a material, generally metal, capable of withstanding temperatures over 600° C., such as iron, steel, stainless steel, or nickel alloy. The housing 18 is shown as a rounded off square, but it can be other configurations. Also shown are oxidant inlet lines 20, where, for example, air can be fed into the bottom of the modules. Attachment means, such as flanged connections,are shown at the top of the housing 18 to bolt or otherwise attach an exhaust gas manifold (not shown). In one embodiment of the module housing, shown in more detail in FIG. 2, oxidant from oxidant inlet lines 20 can be fed into integral, cooling ducts 22 distributed along the housing walls 24. Interior thermal insulation 26 is also shown. The arrows show the direction of oxidant or other cooling gas. Modules 10 and 12 would fit inside the housing 18 where shown.

Figure 3:
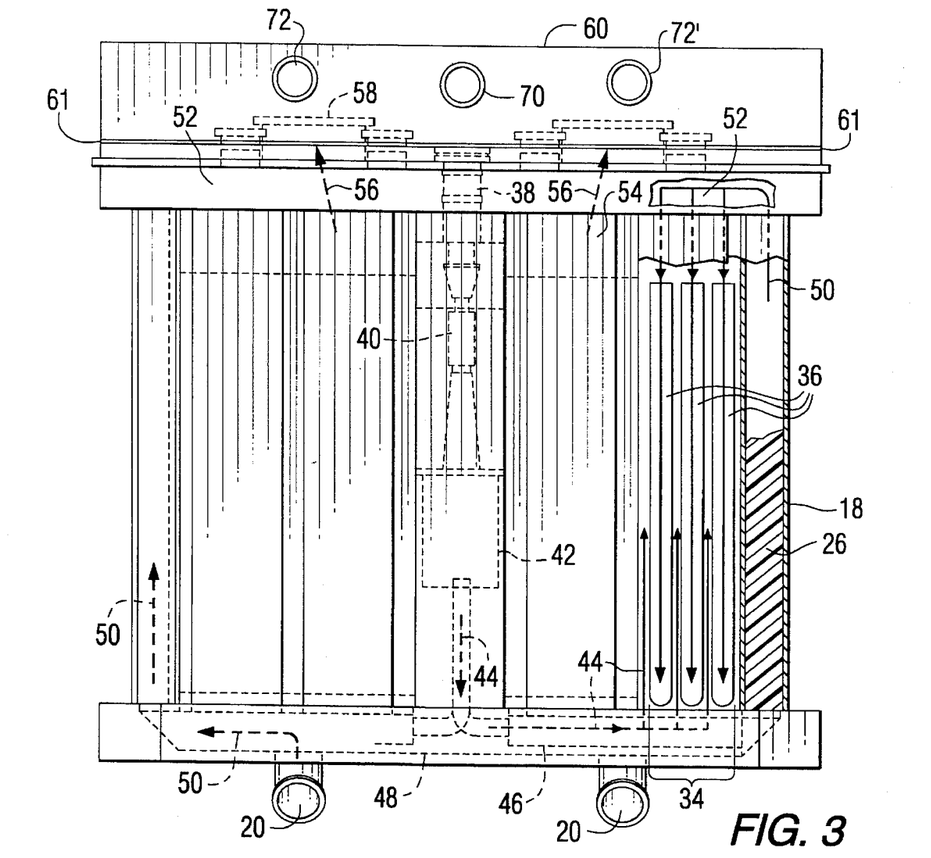
FIG. 3, shows a cross-sectional view of the fuel cell assemblies of FIG.1, showing oxidant and fuel flow paths.
Figure 4:
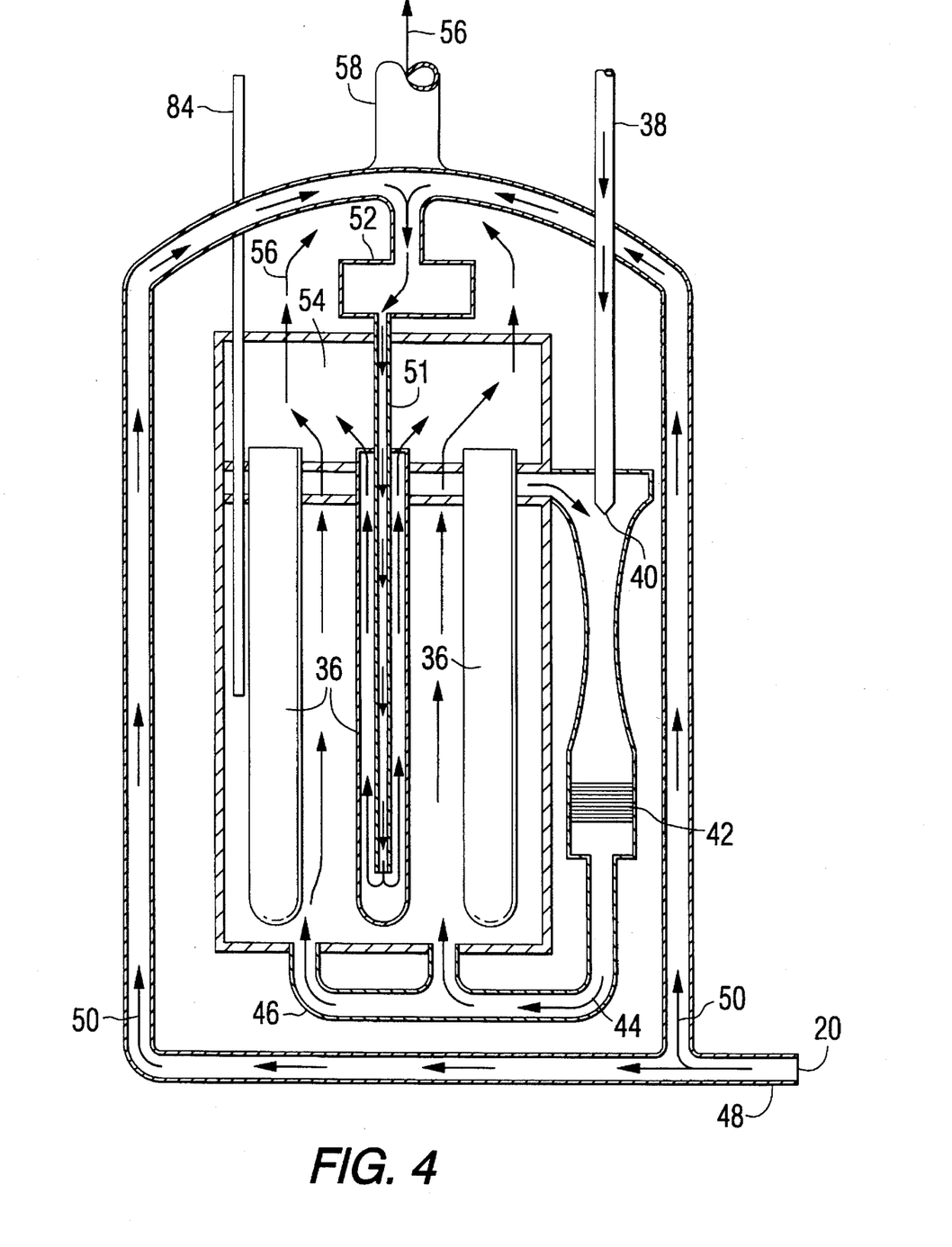
FIG. 4, shows a gas flow schematic of a fuel cell assembly.

FIG. 3 is a cross section of the front of the fuel cell assembly modules and pre-reformers of FIG. 1 along line 3—3, showing fuel cell bundles 34 and FIG. 4 is a gas flow schematic. Both will be referred to in describing the fuel cell stack, or assembly, operation. Each bundle contains a plurality of interconnected fuel cells 36, here shown as of the tubular SOFC type, with electrodes and sandwiched electrolyte. The housing 18, surrounded by interior insulation 26, and exterior insulation between the housing and a surrounding pressure vessel (not shown), can contain cooling ducts around its periphery. Fuel would enter fuel inlet piping 38 and pass, preferably to one or more ejectors 40, where recirculation gases may inject-mix with feed fuel, to provide a stream useful in the prereforming section 42, where it is at least partially reformed, and to otherwise provide optimal operating conditions. The fuel stream 44 then exits pre-reformer 42 and passes through a fuel plenum 46 and into fuel supply lines which transfer or pass at least partly reformed fuel to the outside of fuel cells 36, as shown in FIG. 3 and FIG. 4, where the fuel reacts along the elongated fuel electrode surface on the exterior of the tubular fuel cells 36. The fuel can be more complete reformed within the fuel bundles.

As shown in FIG. 3 and FIG. 4, oxidant enters air manifold 48, through oxidant inlet lines 20, as oxidant stream 50, passing upward, possibly through cooling ducts, to a top air distribution plenum 52. (The left portion of the fuel plenum 46 has been removed for clarity of illustration in FIG. 3.) The oxidant stream then is transferred and passes downward via individual oxidant feed tubes 51, shown in FIG. 4 into the bottom interior of each fuel cell 36, where, as is well known in the art, the oxidant reverses flow and passes in the annular space between the oxidant feed tube and the interior air electrode, where it reacts along the air electrode interior surface. The reacted oxidant finally enters a combustion chamber section 54 as spent oxidant. The spent oxidant then combusts with spent fuel, and some remaining unreacted feed fuel, to provide exhaust gas 56, which flows to an exhaust manifold 60, shown in FIG. 3. Part of the spent fuel may also be recirculated to the ejector 40, as shown in FIG. 4. The exhaust gas 56 passes through exhaust ducts 58 into the exhaust gas manifold 60. A power lead 84 is also shown in FIG. 4. Further details on these flow patterns as well as use of an ejector system can be found in U.S. Pat. No. 5,169,730 (Reichnet).

Very importantly, especially during pressurized operation, it may be possible, perhaps because several cell bundles become inoperable so that some fuel is not utilized, that small volumes of unreacted fuel diffuse or leak into the space 62 outside the fuel cell assembly modules and module housing. Any unreacted fuel within containment wall 18 may ignite because the auto ignition temperature of feed fuel, such as natural gas, is about 520° C. As described previously, fuel leakage into volume, or space, 62, which has a temperature gradient from 25° C. to 600° C. could possibly provide an unstable/combustion problem. This invention provides a means to control the possibility of such combustion.

Prevention of combustion takes advantage of the fact that both an oxidant and a fuel must be present in the proper proportions for combustion to occur. The combustion of gaseous fuels will occur only within a limited range of fuel concentration in air. If the fuel concentration is lower or higher than the flammability limits, combustion will not occur. Such prevention of combustion is accomplished here by venting/purging where fuel leakage might be expected, using air, or an inert gas, where air is preferred for economic reasons. Suppression by mechanical containment can also be applied under certain operating conditions, such as, when the operating pressure is low during startup. Since the pressure vessel will be designed for operating pressure up to 20 about atmospheres, there exists some maximum pressure, near 1 atm, below which the mechanical strength of the containment is sufficient to contain a deflagration (sub-sonic flame propagation) explosion.

Figure 5:
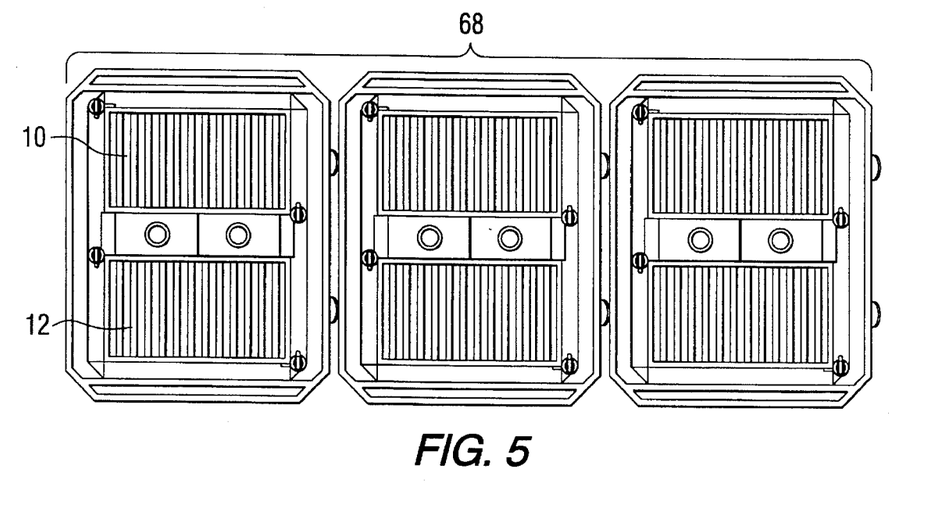
FIG. 5, shows one embodiment of an array of three close packed generators which provides a compact power block.

The two most likely causes for explosive conditions are due to fuel buildup during startup and due to fuel leaks during operation. Flame management can consist of a series of sensors and interlocks which prevent the occurrence of explosive conditions. The management of unreacted fuel in the volume, or space, 62 becomes even more critical when an array of electrically connected generators are used to provide a horizontally disposed power block 68, as shown in FIG. 5.

Figure 6A:
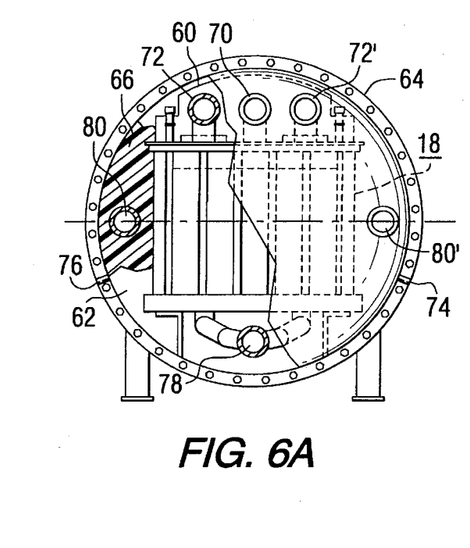
FIGS. 6A and 6B, which best illustrates the invention, show a cross-sectional view of three close packed generators enclosed in a horizontally disposed pressure vessel having two ends, where there is a purge gas volume between the generators and the pressure housing, with flow of purge gas shown where 6A is an end view and 6B is a side view.
Figure 6B:
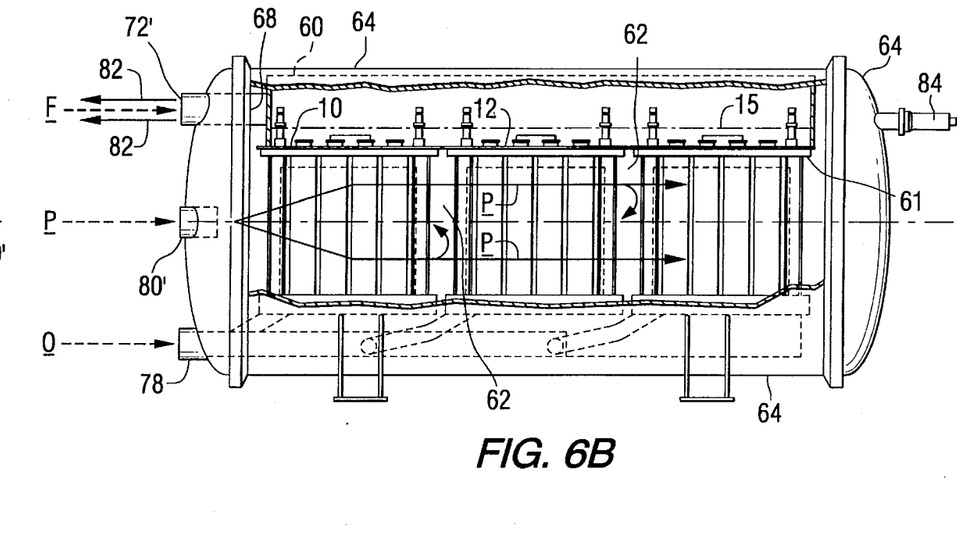

The general approach of this invention, as shown in FIGS. 6A and 6B, is to control unwanted, excess, unreacted fuel in the volume 62 outside the module housing, or canister, around the fuel cell modules. This approach is to enclose the generator fuel cell stack modules within a high strength, low temperature pressure vessel 64 for pressure containment, and provide gas purge flow within the pressure vessel, in the purge gas volume, or space, 62, to prevent the accumulation of combustible gas. The module housing, or canister, 18 around the cell stack separates feed fuel from the purge gas. This invention also creates conditions within the pressure vessel 64, such that, if fuel leaks into the purge gas it will ignite locally instead of accumulating to form an explosive mixture, and interlocks the entire system to prevent pressurization unless the above conditions have been met. Then, the purge gas is monitored for the presence of combustible gas, and the fuel system is interlocked to interrupt fuel flow if combustible gas is detected.

FIG. 6, shows SOFC modules within the module housing 18 surrounded by thermal insulation 66 (FIG. 6A end view, partially shown) and contained within the pressure vessel 64. The insulation 66 would contain a great many minute passageways within its bulk volume where combustible gas might accumulate. Fuel, F, enters through, for example, a fuel inlet solenoid valve, and piping, and is directed inside of the module housing 18. A catalytic material 68 effective to ignite fuel, such as platinum wire, can surround the fuel line, 70 between the vessel wall and the module housing, a possible area for fuel leakage. This catalyst would serve to ignite locally any leaking fuel. Process or oxidant air, O, is supplied to the inside of the SOFC's through, for example, a flow sensor, and air feed tubes as described previously. A portion of the fuel and process air is combined electrochemically within the SOFC's to produce DC current, heat, and fuel oxidation products. The unconsumed fuel is burned in air in the combustion chamber above the cells. Purge gas, P, flows outside of the module housing, entering, for example, through flow sensors from, in one embodiment, one end/end cap of the pressure vessel. Preferably, power lines 84 are located at one end cap of the pressure vessel and all gas inlets and exits at the other end cap.

In the embodiment shown in FIG. 6B, the purge gas P combines with the combustion chamber exhaust at the top of the module housing and flows out of the pressure vessel through exhaust pipes 72 and, for example, a pressure control valve. Thermocouples, or other heat measuring devices, 74 (FIG. 6A, only one shown) are attached to the module housing and/or pressure vessel to measure wall temperatures. The thermocouples 74 are electrically interlocked/connected to a fuel inlet valve (not shown) and to an exhaust gas pressure control valve (not shown) such that fuel flow and pressurization cannot be initiated unless the module housing temperature is up to about 520° C., the autoignition fuel temperature. Sample tubes or combustible gas sensors, or other gas composition measuring devices, 76 (FIG. 6A, only one shown) are positioned within the pressure vessel to sample the amount of fuel gas in the purge air for combustible gas. These tubes or sensors are eleectrically interlocked/connected to a fuel inlet valve so that if the amount of unreacted fuel gas in the purge gas constitutes a combustible mixture, the fuel inlet flow is shut off.

Flow sensors (not shown) are located in the purge air entry line 80 and 80' and are electrically interlocked to the fuel supply valve such that the fuel inlet flow will be shut off (or cannot be initiated) unless the purge air is flowing in an appropriate amount. Similarly, the exhaust gas pressure control valve, will be electrically interlocked to the thermocouples and the purge air flow sensors, such that, the system cannot be pressurized if the purge air is not flowing and/or the module housing temperature is below the autoignition temperature of about 520° C.

The electrical interlocks which are effective to deactivate/close selected valves and the like by any electrical control means, prevent pressurization until the module housing temperature has reached the autoignition temperature of the fuel, ensure that if an undetected combustible gas mixture exists prior to startup and is ignited when the module housing temperature reaches the autoignition temperature, the resulting deflagration explosion will occur at or near 1 atmosphere. The maximum overpressure can be expected to be about 8 atmospheres, which is less than the vessel design pressure of 10 atmospheres to 20 atmospheres.

Since the SOFC's operate at temperatures near 1000° C., thermal insulation 66 is usually required between the inner canister, that is, the module housing 18 and the pressure vessel wall 64 to prevent high temperatures at the pressure vessel wall. Using ceramic fiber board or blanket insulation within the purge gas volume 62 and possible air or water cooling of the module housing 18, pressure vessel wall temperatures between 25° C. and 150° C. are achievable, so that the pressure vessel can be constructed of carbon steel, which is a relatively inexpensive material.

Thus, in operation, the fuel cell generator apparatus shown in FIG. 6B passes feed oxidant gas, O (dotted line), through pressure vessel 64 at, for example, oxidant pipe 78, while fuel, such as feed natural gas, F (dotted line), passes through pressure vessel 64 at, for example, fuel pipe 70. Purge gas, any gas effective to delete fuel and provide a noncombustible mixture, air, or an inert gas such as argon, nitrogen, or the like, P (dotted line), passes into pressure vessel 64, at, for example, one or more purge gas pipes 80 and 80'. Additionally, exhaust gas, designated by flow arrows 82 (solid lines), passes out of pressure vessel 64, at for example, one or more exhaust pipes 72 and 72' (which are shown on the same horizontal plane as fuel entry 70). All of these lines are shown passing through the end/end cap 64 of the pressure vessel, but they can be located at other positions, such as on the side of the pressure vessel, depending on design considerations. Fuel, F, oxidant, O, and purge gas, P, will all be pressurized over 28.5 psi. usually between 28.5 psi. (2.0 kg/cm$^2$) and 294 psi. (20.7 kg/cm$^2$), preferably between 73.5 psi (5.18 kg/cm$^2$) and 220.5 psi (15.54 kg/cm$^2$).

The purge gas, P, passes into the purge gas volume 62 and circulates around the fuel cell stack modules, such as 10, 12, 13 and 15, between the module housings 18 and the pressure vessel 64. This circulation of purge gas will dilute any unreacted feed fuel which might have migrated/leaked from the modules. The purge gas, with any unreacted feed fuel will pass out of the pressure vessel. One means to exit the purge gas, P, is by allowing it to deliberately leak into the exhaust gas manifold 60 through a loose seal 61 between the manifold 60 and the top of module 18, best shown in FIG. 3, and exit with the exhaust gas 82 through one or more pipes 72 and 72'. In another embodiment, line 80 may be used as a purge gas inlet and line 80' used as a purge/leaked fuel gas outlet, where a pump for gas in and a pump for gas out would insure effective circulation of the purge gas. Exit through tile manifold 60 is preferred. The flow rate of the purge gas, P will be in an amount effective to prevent an explosive mixture of purge gas and fuel gas, and may vary depending on purge gas volume. The flow rate of the purge gas should be from about 1 vol.% to about 5 vol.% of the feed oxidant gas flow rate. While many factors are involved in the determination of a maximum allowable fuel leak, unreacted fuel in the purge gas should be kept below about 1000 ppm (parts per million), about 20% of the lower explosive limit.

The module housing 18, located between the SOFC;s and the thermal insulation, is a container, such that, even though not of completely sealed design, fuel is constrained to remain inside and purge gas outside. The pressure difference across the module housing wall is small, which minimizes mechanical loads on the wall and fuel leakage flow rates in the event of module housing leaks. The pressure difference across the module housing 18 is also positive (higher pressure inside than outside) to insure that any gas leakage is outward. The module housing operating temperature will be greater than the autoignition temperature of the fuel gas (about 520° C. for hydrogen), thus, any fuel leaking from the module housing into the purge air will spontaneously ignite locally, preventing the accumulation of an explosive mixture inside of the pressure vessel. The pressure difference across the loose seal 61 is such that exhaust gas from combustion chamber 54, shown in FIG. 3, flows into exhaust gas manifold 60 and exits through appropriate exits 72 and 72', and if the seal 61 between the module housing 18 and manifold 60 is appropriately loose, purge gas from purge gas volume 62 will pass into the manifold 60 and also out exits 72 and 72'.

Figure 7:
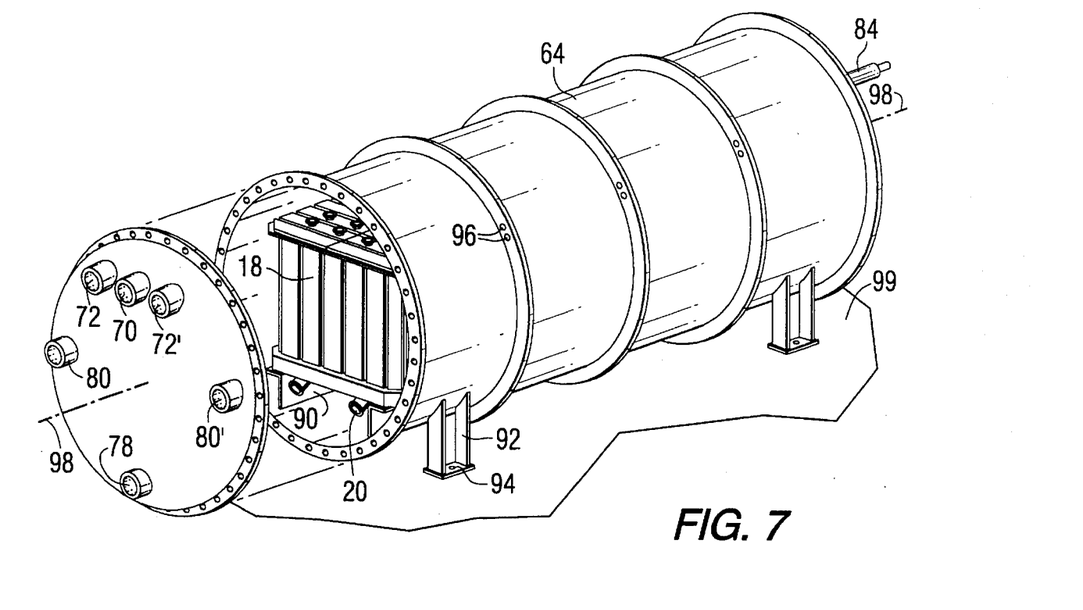
FIG. 7, shows an exploded three dimensional view of a four module, transportable, low, center of gravity generator.

FIG. 7 illustrates the transportable modular design of an assembled multimodule fuel cell generator apparatus. The pressure vessel 64 length can be varied to accommodate a number of 575 kW fuel cell modules of about 2,500 fuel cells per module. The four module apparatus shown provide a 2.3 MW generator. The center of gravity may be below the horizontal axis 98 of the pressure vessel, providing an easily transportable assembly. The surface 99 can be that of a transport vehicle, or concrete or the like at a final destination.

As an example, the SOFC generator apparatus of this invention has been designed and configured to be compatible with small gas turbine units to provide a combined plant size suitable for distributed generation applications. An initial configuration provides for 1.7 MW of SOFC power, targeting an initial demonstration plant application that combines with a 1.4 MW gas turbine to provide an overall net 3 MW plant capability. The SOFC generator is being designed to operate at a pressure of 10 atmospheres, which provides for improved fuel cell performance when compared with atmospheric units. The 1.7 MW generator consists of three modules, each producing about 575 kW, contained within a common vessel. The use of a common vessel eliminates the need for most of the high pressure piping that would be required for handling the hot air and exhaust streams from individual pressurized submodules. Each module contains about 2,500 fuel cells arranged in two "substacks" of 1250 cells. The module uses a gas recirculation loop that provides water for the reforming reactions, and is shared between the two substacks. Each module has its own power leads and insulation, and is contained within a module housing or canister, that prevents the loss of fuel gas from the stack. The submodules may be connected electrically in a variety of ways. By creating two parallel paths, each of which has one half of each submodule connected in series, a terminal voltage of about 835 volts and current of about 2075 amps is obtained.

Individual module dimensions are 2.9 meters in width, 2.4 meters long, and 2.9 meters high. Within the outer pressure vessel, common headers are provided for supplying each module with process air, fuel, and purge gas and removing the exhaust stream and circulated purge gas. The overall pressure vessel dimensions, for a three module unit, are 4.2 meters in diameter, and 9.3 meters in length. Penetrations of the pressure vessel are made at the two ends and provide access to the purge gas and to the air and exhaust piping that is connected to the turbine unit.

As can be seen from FIG. 7, using an axially-elongated, horizontally disposed pressure vessel with two ends allows a low center of gravity, horizontal modular configuration that is easily transportable by truck or rail. To this end, the SOFC modules rest on welded L plates 90 within the pressure vessel, as shown. Four or more steel rest plates or "feet" 92 support the generator apparatus in a horizontal position and have holes 94 for temporary or permanent placement. Hooks could also be attached, as through holes 96 or by any other means for lifting the apparatus. This, of course, shows only one embodiment of the apparatus, and is not meant to be limiting.

Figure 8:
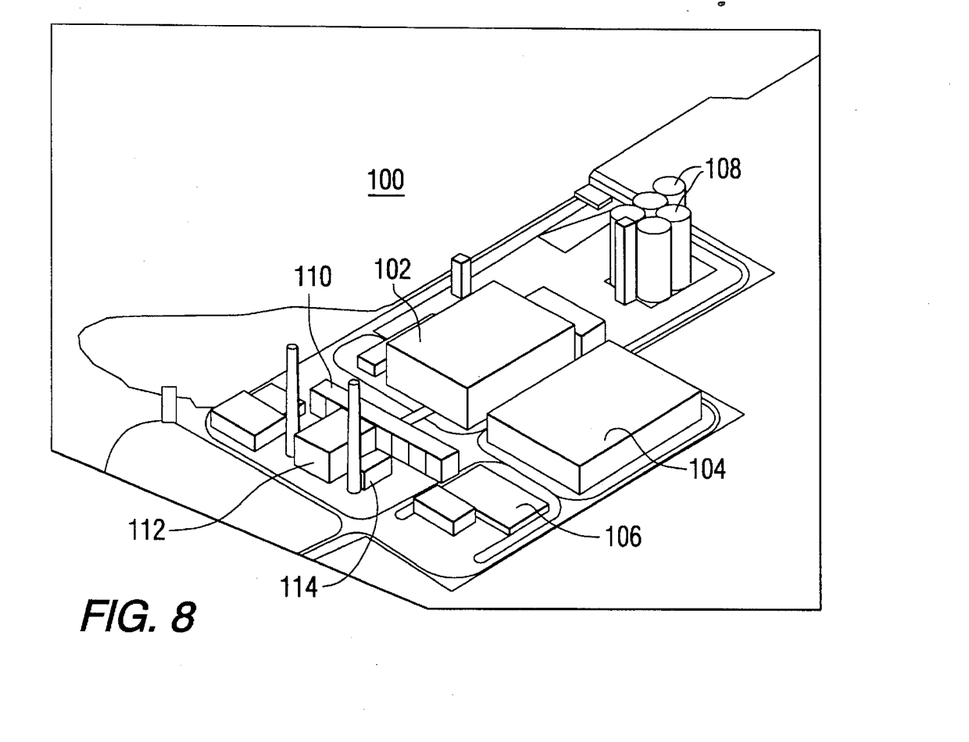
FIG. 8, shows one embodiment of a 300 MW integrated coal gasification/fuel cell-steam turbine power plant, utilizing a plurality of fuel cell generators, such as shown in FIG. 7.

FIG. 8 depicts a 300 MW, integrated coal gasification/fuel cell steam turbine power plant 100. Coal gasification unit 102, air separation (oxygen) plant 104, DC/AC conversion and electrical switch gear and power conditioning unit 106 are shown, along with five, 50,000-ton coal storage silos 108. The fuel feed from the coal gasification units can operate SOFC apparatus 110, described previously, which in turn are associated with a heat recovery steam turbine 112 and heat recovery steam generator 114.

In a pressurized SOFC system, described previously, a compressor could compress ambient air, which could be supplied to the fuel cells, and the purge volume after being preheated by a recuperator. The hot gas from the power blocks could be pumped at high pressure to a combustor, producing further heated hot gas that could be expanded in a turbine to produce power. The turbine could in turn run a compressor for pressurizing the oxidant stream, as in U.S. Pat. No. 3,972,731 (Bloomfield et al.). Also, in a pressurized SOFC system, the hot gas from the SOFC's could be directed to a turbine by way of a topping combustor that is supplied with fuel, to produce a still further heated hot gas that is then passed to and expanded in a turbine apparatus as in U.S. Pat. No. 5,413,879 (Domeracki et al.). In the integrated gas turbine/solid oxide fuel cell system, the major components of the system would be a compressor, a turbine, a rotor by which the turbine drives the compressor as well as an electrical generator, a fuel pre-heater, an air pre-heater, a fuel desulfurizer, a solid oxide fuel cell generator with a combustion chamber, a topping combustor and an exhaust stack.

In operation, the compressor, which includes rows of stationary vanes and rotating blades, inducts ambient air and produces compressed air. The compressed air is subsequently heated by the air pre-heater. The air preheater, which may be of the tube and shell type, has heat transfer surfaces that allow heat to be transferred from the turbine exhaust gas discharged by the fuel pre-heater, to the compressed air, thereby producing heated compressed air. The compressed air can be heated into approximately the 500° C.–600° C. The heated compressed air is then directed to the SOFC generator and purge volume within the pressure vessel surrounding the SOFC's. Gaseous fuel, which may be natural gas or a coal derived fuel gas, is driven by a pump through the fuel pre-heater. The fuel pre-heater, which may be of the finned tube type, has heat transfer surfaces that allow heat to be transferred from the exhaust gas discharged by the turbine to the fuel, thereby producing heated fuel. The fuel can be heated to approximately 400° C. The heated fuel is then directed to a desulfurizer, which may comprise a vessel containing a bed of sulfur sorbent through which the fuel flows. The fuel exiting from the desulfurizer, preferably, has less than 0.1 ppm of sulfur.

Figure 9:
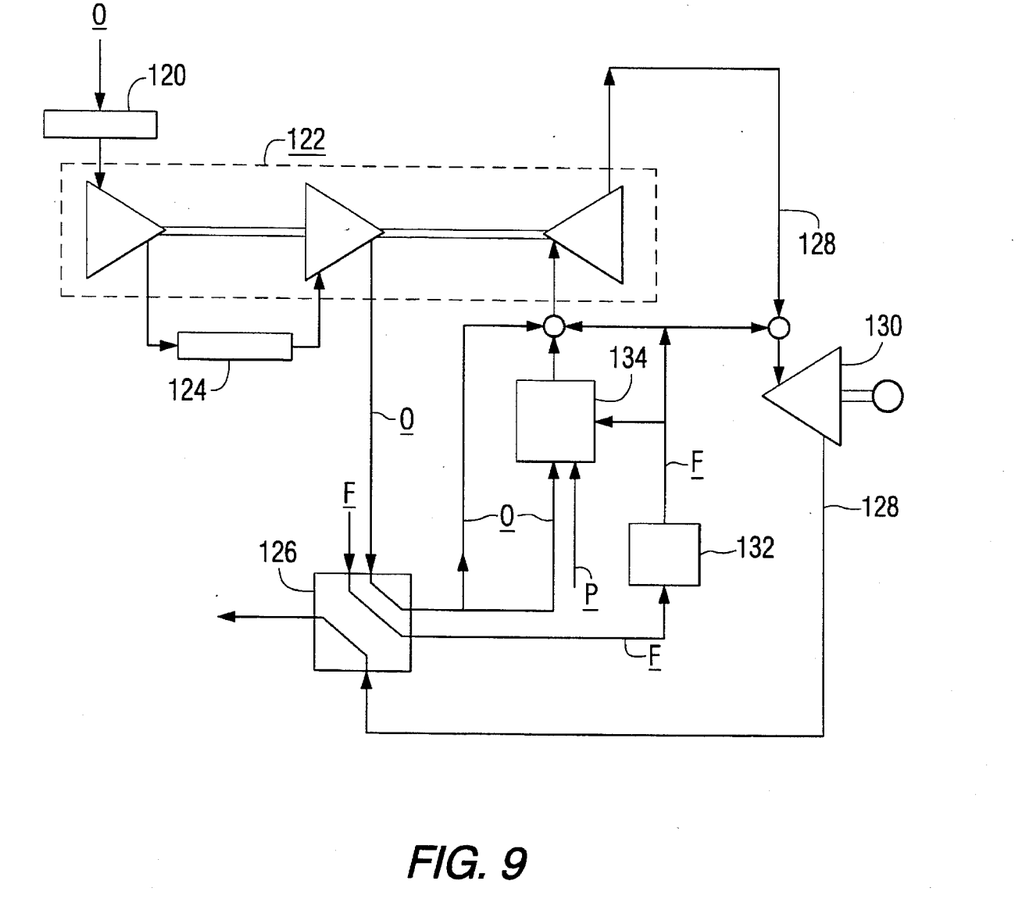
FIG. 9, shows one specific embodiment of an SOFC-combustion turbine configuration.

One specific example for operation of the fuel cell generator apparatus of this invention is shown in simplified form in FIG. 9. Oxidant, such as air, O, passes through filter 120 into a compressor turbine system 122 also passing through intercoller 124 between two compressors. Compressed, oxidant O, as well as pumped fuel F, which may pass through a fuel compressor if necessary, enters recuperator/fuel heater 126 which is heated by exhaust 128 originating from the turbine of system 122 and a power turbine/generator 130. Fuel F passes through a desulferizer 132 and then, along with oxidant 0, is fed into the fuel cell generator apparatus 134. Pressurized oxidant also passes as purge gas to the purge volume between the SOFC's and their pressure vessel. Exhaust gas from fuel cell generator apparatus 134 then passes onto the turbine of the compressor/turbne system 122.

Figure 10:
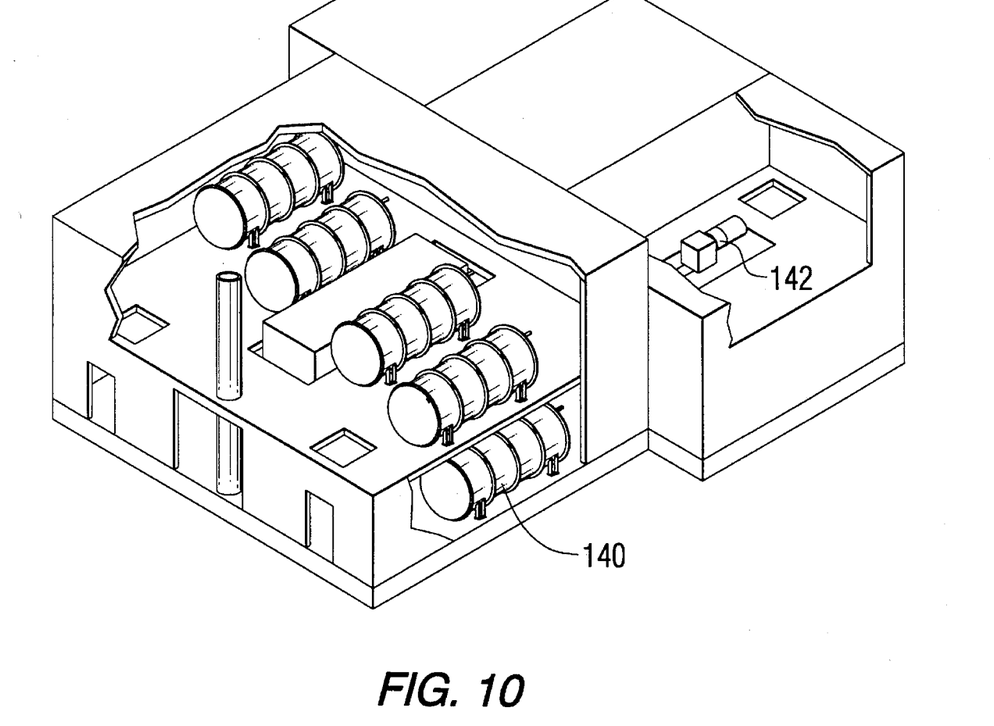
FIG. 10, shows one embodiment of a 20 MW liquified natural gas fueled fuel cell-steam turbine; all electric power plant utilizing a plurality of fuel cell generators, such as shown in FIG. 7.

While FIGS. 8 and 9 have been generally described using SOFC, other types of fuel cell, could be used in such systems, as described previously. These are only one of the designs that could use the fuel cell generator apparatus of this invention. They are also applicable to SOFC cogeneration systems utilizing steam from boilers; liquified natural gas fueled SOFC, all electric power plants; repowering of existing fossil fuel power plants; and navel ship electrical propulsion. FIG. 10 illustrates a design for a 20 MW liquified natural gas fueled SOFC all-electric power plant. The key features include a plurality of the modular fuel cell generator apparatus 140 described previously, a heat recovery system, steam turbine system 142 and a power conditioning system.

The fuel cell generator apparatus of this invention can also be used very advantageously with a small combustion turbine system to form a 3 MW plant. the plant would be well suited for the cogeneration, power quality and distributed power markets and is suitable for siting within a light industrial one. The power system is based on a combustion turbine that is intercooled, recuperated, and reheated. The intercooled, recuperated gas turbine engine would provide pressurized air to the fuel cells, and the hot exhaust gas from the fuel cells would be expanded through a radial inflow power turbine. A single stage air-to-air intercooler would be used to reduce compressor work and to increase the efficiency of the recuperator. The SOFC generator apparatus would be placed ahead of the high-pressure combustor, and the hot SOFC exhaust would provide some or all of the combustor's oxidant stream. To accommodate the SOFC system, the cycle would be equipped with a desulfurizer system to process the SOFC natural gas fuel. The SOFC system would be sized, and the operating point selected, such that SOFC heat provides sufficient inlet temperature at the compressor turbine inlet to eliminate the need for fuel flow to the combustor.

We claim:

1. A fuel cell generator apparatus, comprising at least one fuel cell stack module containing a plurality of fuel cells, each fuel cell having electrolyte between an oxidant electrode and a fuel electrode; where the module is enclosed by a module housing capable of withstanding temperatures over 600° C.; where the module housing is surrounded by an axially-elongated pressure vessel having two ends, such that there is a purge gas volume between the module housing and the pressure vessel; where the pressure vessel has a fuel gas inlet connecting to a module fuel gas inlet, an oxidant gas inlet connecting to a module oxidant gas inlet, an exhaust gas outlet connecting to a module exhaust gas outlet, and a purge gas inlet connecting to the purge gas volume between the module housing and the pressure vessel; and where the purge gas volume is effective to control any unreacted fuel gas flow from the module by dilution with purge gas.

2. The apparatus of claim 1, where the fuel cells can operate at temperatures over about 650° C. and up to about 1100° C., the module housing and the fuel cells can operate at pressures over about 28.5 psi. and the pressure vessel is horizontally disposed.

3. The apparatus of claim 1, where the module oxidant gas inlet connects to cooling ducts in the module housing, to allow gaseous oxidant passage through the cooling ducts to the fuel cells.

4. The apparatus of claim 1, where module fuel gas inlet connects to a pre-reformer.

5. The apparatus of claim 1, where an ignitable catalytic material, effective to ignite fuel surrounds the fuel gas inlet line.

6. The apparatus of claim 1, where heat measuring devices and combustible gas sensors are disposed within the pressure vessel near the purge gas volume and are connected to shut off fuel.

7. The apparatus of claim 1, where flow sensors are disposed in the purge gas inlet line and are connected to shut off fuel inlet.

8. The apparatus of claim 1, where thermal insulation is disposed within the purge gas volume.

9. The apparatus of claim 1, containing at least two electrically connected, horizontally disposed fuel cell stack modules.

10. A method of operating a fuel cell generator apparatus comprising the steps of:

(1) passing oxidant gas and fuel gas, both being pressurized, through inlets and into a plurality of fuel cell assembly modules, each module containing a plurality of fuel cells, each fuel cell having electrolyte between an oxidant electrode and a fuel electrode, where the modules are each enclosed by a module housing capable of withstanding temperatures over 600° C.; where the module housings are surrounded by an axially-elongated pressure vessel having two ends, such that there is a purge gas volume between the module housings and the pressure vessel, the oxidant gas and fuel gas also passing through the pressure vessel enclosing the modules;

(2) passing pressurized purge gas through the pressure vessel to circulate within the purge gas volume, where the purge gas dilutes any unreacted fuel gas flow from the module; and (3) passing exhaust gas and circulated purge gas and any unreacted fuel gas out of the pressure vessel.

11. The method of claim 10 where the fuel cells operate at temperatures over about 650° C. and up to about 1100° C., the module housing and the fuel cells operate at pressures over about 28.5 psi., and the pressure vessel is horizontally disposed.

12. The method of claim 10, where the apparatus is associated with and works in cooperation with auxiliaries selected from at least one of: controls, oxidant preheater, fuel gas compressor, fuel gas desulfurizer, oxidant compressor, purge gas compressor, a power turbine connected to an electric generator, and a heat exchanger.

13. The method of claim 10, where the module housing and fuel cells operate at pressures from about 28.5 psi. to about 294 psi.

14. The method of claim 10, where the fuel cells are solid oxide electrolyte fuel cells and the purge gas passes through thermal insulation within the purge gas volume.

15. The method of claim 10, where the oxidant goes and fuel gas pass to contact the electrodes of the fuel cells and the fuel gas is at least partly reformed before passage to the fuel cells.

16. The method of claim 10, where the oxidant gas, fuel gas, and purge gas are all pressurized between 73.5 psi. and 220.5 psi., and the flow rate of the purge gas is in an amount effective to prevent an explosive mixture of any leaking fuel gas and purge gas.

17. The method of claim 10, where the oxidant gas passes through inlets and then to cooling ducts in the module housing to cause gaseous oxidant passage through tile cooling ducts to the fuel cells.

18. The method of claim 10, where oxidant gas is passed through a compressor/turbine system to pressurize the oxidant gas before step (1); fuel gas is passed through a desulfurizer before step (1); and exhaust gas is passed into a compressor/turbine system after step (3).

19. The method of claim 10, where heat measuring devices measure module housing temperature, and are electrically connected to shut off fuel inlet if the module housing temperature is below about 520° C.

20. The method of claim 10, where combustible gas sensors measure the amount of fuel gas in the purge gas, and are electrically connected to shut off fuel inlet if the amount of fuel gas in the purge gas constitutes a combustible mixture.

21. The method of claim 10, where flow sensors measure purge gas flow, and are electrically connected to shut off fuel inlet if purge gas is not flowing.

22. The method of claim 10, where the fuel cells are tubular, solid oxide electrolyte fuel cells operating at temperatures between about 650° C. and about 1100° C.

23. The method of claim 10, where a plurality of generator apparatus are electrically connected to provide a power block.

24. A method of assembling fuel cells in a fuel cell generator apparatus comprising the steps:

(1) electronically connecting together a plurality of fuel cell assembly modules in a horizontal plane each module containing a plurality of fuel cells;

(2) inserting the connected modules into an axially-elongated, horizontally disposed pressure vessel having two ends, to provide a low center of gravity generator apparatus, where there is a purge gas space between the modules and the pressure vessel;

(3) providing inlets into the pressure vessel for feed fuel, feed oxidant, and purge gas, and outlets for exhaust gases.

25. The method of claim 24, where the pressure vessel is sealed.

* * * * *